July 26, 1955        B. E. DIXSON        2,713,726

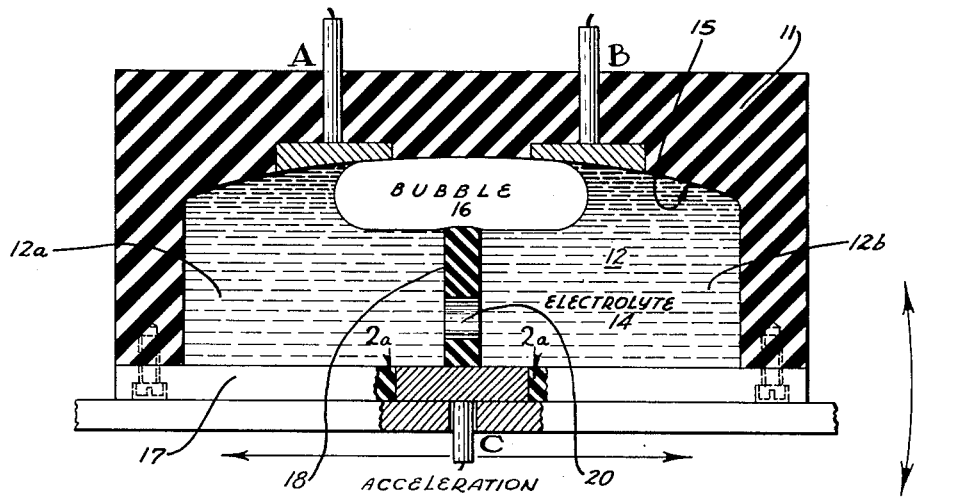
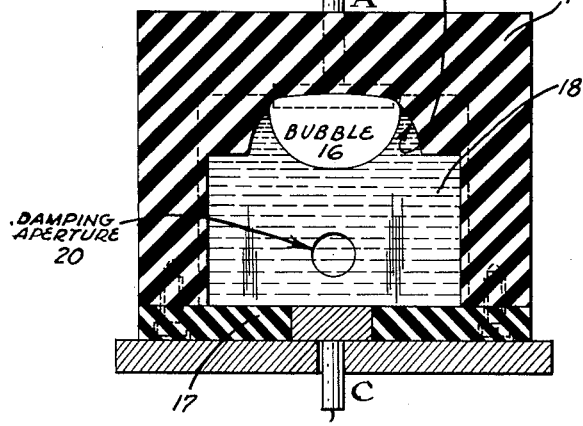
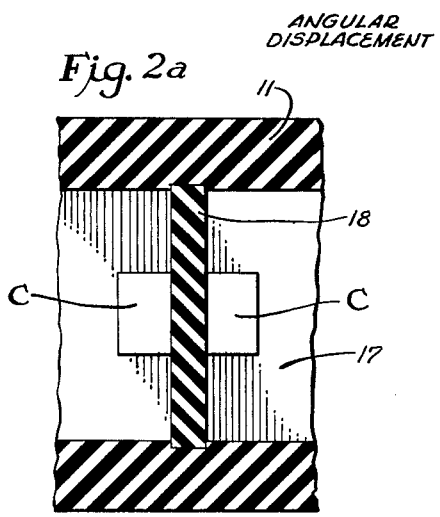

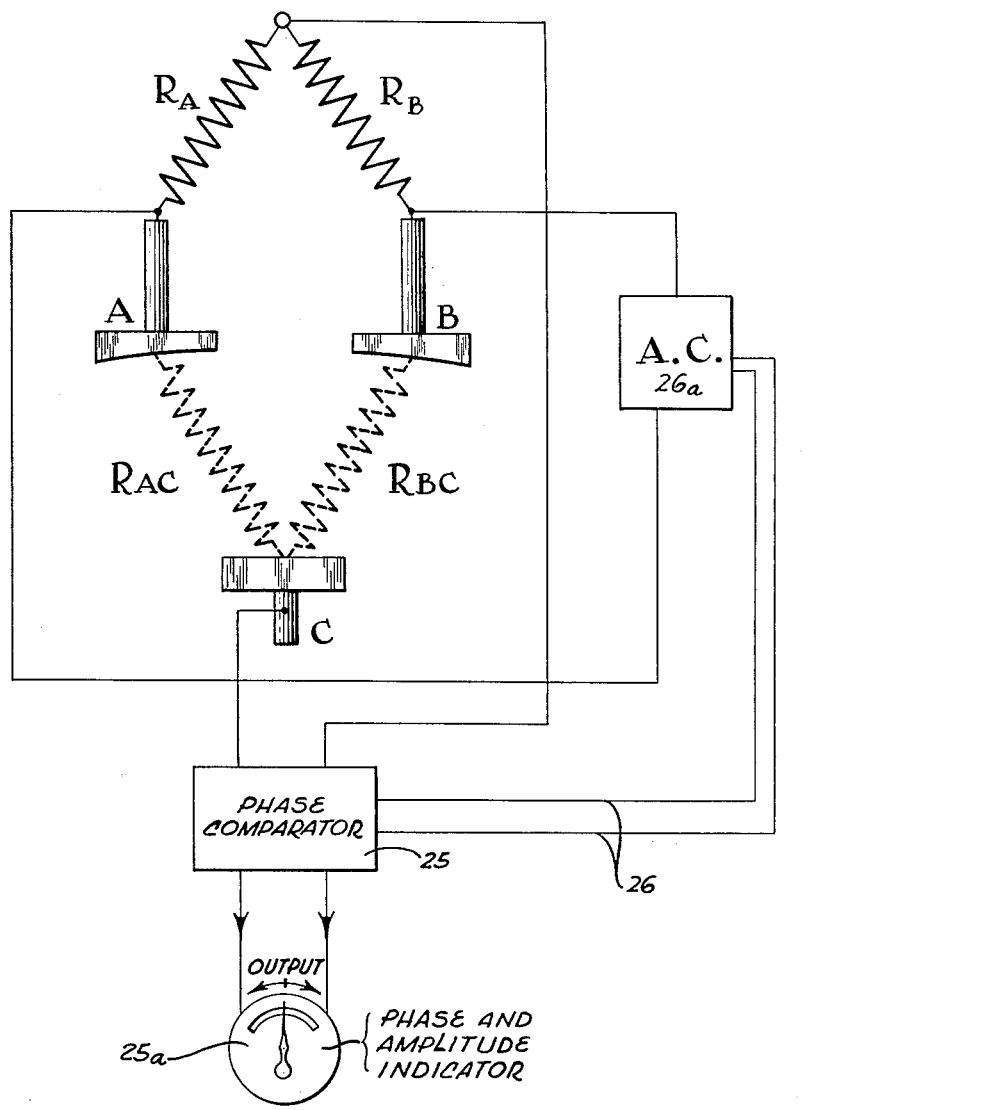

BUBBLE LEVEL CONDITION INDICATOR

Filed Sept. 23, 1948        4 Sheets-Sheet 3

INVENTOR.
BRUCE E. DIXSON
BY Herbert E. Metcalf
ATTORNEY

July 26, 1955        B. E. DIXSON        2,713,726
BUBBLE LEVEL CONDITION INDICATOR
Filed Sept. 23, 1948        4 Sheets-Sheet 4
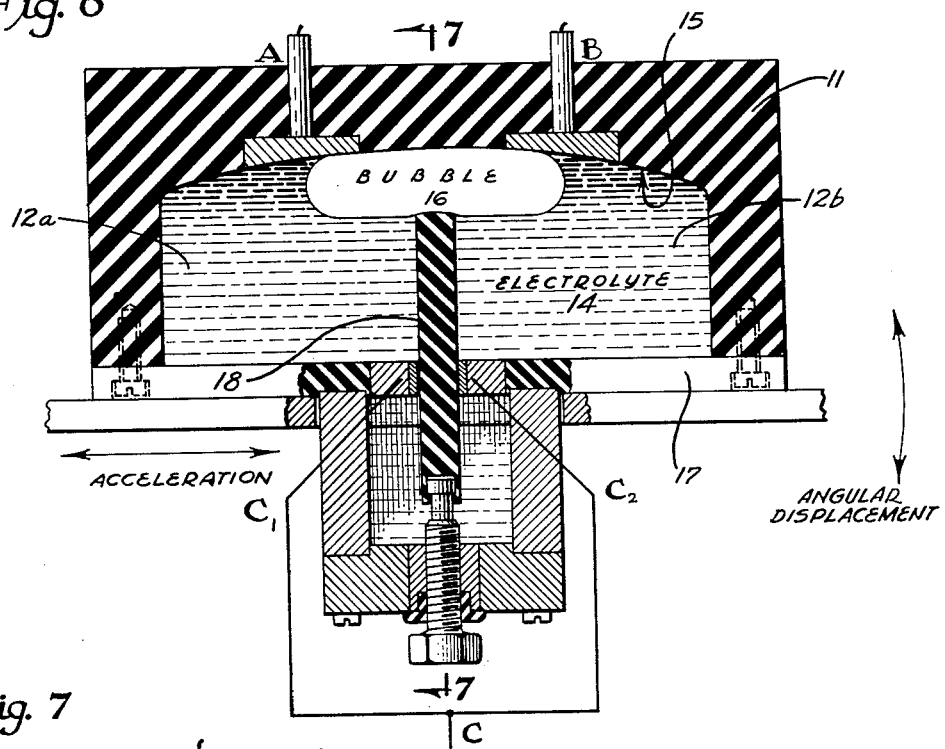
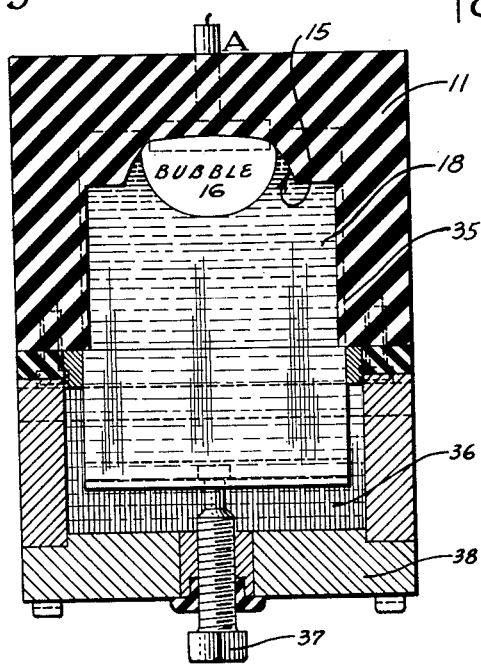
INVENTOR.
BRUCE E. DIXSON
BY Herbert E. Metcalf
ATTORNEY United States Patent Office 2,713,726
Patented July 26, 1955

2,713,726

BUBBLE LEVEL CONDITION INDICATOR

Bruce E. Dixson, Hawthorne, Calif., assignor to Northrop Aircraft, Inc., Hawthorne, Calif., a corporation of California Application September 23, 1948, Serial No. 50,770

8 Claims. (Cl. 33—211)

My invention relates to levels of the bubble type, and more particularly to a means and method of generating a signal that is a function of the bubble position in a bubble level.

In an automatic navigation device for example, it is highly desirable to compare the angular relationship of one portion of the device with the apparent vertical. One such specific problem is to measure the departure of a vertical seeking gyroscope rotor from the apparent vertical such as might, for example, be indicated by the position of a bubble in a bubble level. It is highly desirable that bubble displacements be measurable directly to provide a signal that is a function of bubble position within the level, and it is further desirable that the movements of the bubble be properly damped.

It is an object of the present invention to directly and electrically measure the displacement of a bubble in a bubble level.

It is another object of the invention to provide a means and method of damping the movements of a bubble in a low viscosity liquid.

And it is still another object of the invention to provide a means and method of generating an electrical signal that is a function of the position of a bubble in a bubble level.

In broad terms as to method, the invention provides for passing a current through a conducting fluid in which a bubble is present, and positioning the bubble to intersect the current path during bubble movement to obtain a current change, this current change being measured as a signal that is a function of bubble position in the electrolyte.

In broad terms as to apparatus, the present invention involves the use of a bubble level in which a chamber having an incomplete filling of an electrolyte fluid therein to provide a bubble which, when the device is level intersects the two current paths and preferably bisects a pair of electrodes on the upper surface of the chamber. A third electrode is positioned in the bottom of the chamber. When in use, the two electrolyte paths between the two top electrodes and the bottom electrode are preferably utilized as resistances in a bridge circuit. Movement of the bubble across the electrodes changes the bridge conditions and provides an output signal that is a function of bubble displacement. Means are also preferably included in the level to damp the movement of the bubble.

The above and other objects and advantages of the present invention will be more apparent from the following description of a preferred form of the invention shown in the drawings, in which:

Figure 1 is a diagrammatic longitudinal sectional view of a bubble level embodying the present invention.

Figure 2 is a cross-sectional view of the level shown in Figure 1 taken as indicated by line 2—2 in Figure 1.

Figure 2a is a fragmentary view taken as indicated by the line 2a—2a in Figure 1.

Figure 3 is a wiring diagram showing one form of circuit used with the device of Figures 1 and 2 for measuring bubble displacement.

Figure 6 is a diagrammatic longitudinal view showing another way of changing the damping characteristics of the level of the present invention.

Figure 7 is a cross-sectional view taken as indicated by the line 7—7 in Figure 6.

Figure 4:
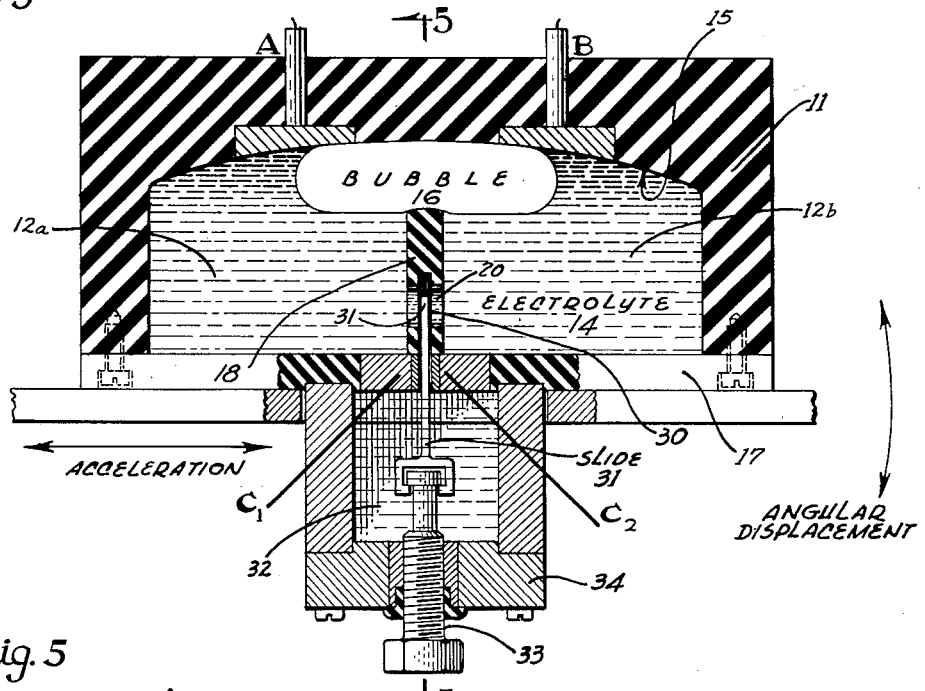
Figure 4 is a diagrammatic longitudinal sectional view showing one way of changing the damping characteristics of the level of the present invention.

Referring first to the device shown in Figures 1, 2 and 2a, a level casing 11 is provided, the inner walls of which form a chamber 12 in which a semiconducting low viscosity electrolytic fluid 14 is contained. This chamber has a curved top surface 15 provided with a pair of spaced top electrodes A and B having the same inner curvature as the top of the chamber. The electrolyte does not completely fill the chamber, thereby providing a bubble 16 which, when the level casing is actually level intersects the two current paths and preferably bisects each electrode A and B. One preferred low viscosity, low surface tension liquid preferred for use in the bubble level embodying the present invention is 200 proof (100%) ethyl alcohol. This is made conducting by the addition of .08 gram of sodium iodide per 100 milliliters of the alcohol.

The bottom 17 of the casing 11 is removable and is provided with a central bottom electrode C which is crossed by a central baffle 18. A portion of the bottom electrode C, however, is exposed to the electrolyte on each side of the baffle 18 as shown in Figure 2a. Baffle 18 extends upwardly to terminate below and close to the bubble 16, being cut away with a bubble surface contour, and is provided with a damping aperture 20 adjacent the bottom thereof. The chamber 12 is thus divided by the baffle and the bubble into two equal chamber sections 12a and 12b connected only by the bubble 16 and the damping aperture 20.

The chamber 12 is only as wide as the bubble, as seen in Figure 2, so that the bubble is only free to move in one plane, in this case the plane of Figure 1. However, any acceleration of the casing in that plane or angular displacement of the casing in that plane, will cause the bubble to move in the chamber, and to move across electrodes A and B, subject to the damping caused by baffle 18 as modified by the damping aperture 20.

This movement of the bubble can be measured, for example, by the circuit shown in Figure 3. While D. C. circuits can be used, I prefer to use an A. C. bridge circuit.

The top electrodes A and B are connected together outside of the casing through two fixed resistances $R_A$ and $R_B$ respectively, then to one side of a phase comparator 25, the other side of which is connected to the bottom electrode C. The two internal resistances $R_{AC}$ and $R_{BC}$ that exist in the electrolyte in chamber sections 12a and 12b, respectively, between the two top electrodes A and B and the single bottom electrode C complete a bridge circuit, the input 26a of which is made to the two top electrodes A and B, these electrodes being energized by A. C. source 26a. The amount and sense of bubble displacement can be read from phase indicator 25a fed by phase comparator 25. Phase comparator 25 is supplied with A. C. from A. C. source 26a by line 26.

Any acceleration or angular displacement of the level casing resulting in motion of the bubble, will produce a resultant variation in the resistances $R_{AC}$ and $R_{BC}$ with the following relationship:

$$R = \int_{l=0}^{l=d} \frac{p\,dl}{A}$$

where $p$ = resistivity of the electrolyte.
$R$ = resistance of electrolyte ($R_{AC}$ or $R_{BC}$).
$l$ = length of current path in the electrolyte.
$d$ = distance between upper and lower electrodes.
$A$ = cross-sectional area of an imaginary block of current carrying electrolyte between an upper electrode A or B and lower electrode C at a distance $l$ from one specified electrode. $A$ is a function of $l$.

An increase in resistance $R_{AC}$, for example, will be accompanied by a corresponding decrease of resistance $R_{BC}$. These variations in the bridge circuit will produce a directional voltage signal in output 26 that is a function of the angular displacement or acceleration of the bubble chamber. Using an A. C. supply, for example, as in the present embodiment of the invention, the bubble sense right or left of a known mid-position is indicated by the phase relationship of the output voltage with respect to supply voltage. The output is in phase with the supply on one side of the null and 180° out of phase at the other side of the null. When using D. C. supply, the bubble sense right or left of the known mid-position is indicated by the reversed polarity of the output lines. A. C. supply is preferably to D. C. to minimize electrochemical action in the electrolyte and at the electrode surfaces.

Figure 5:
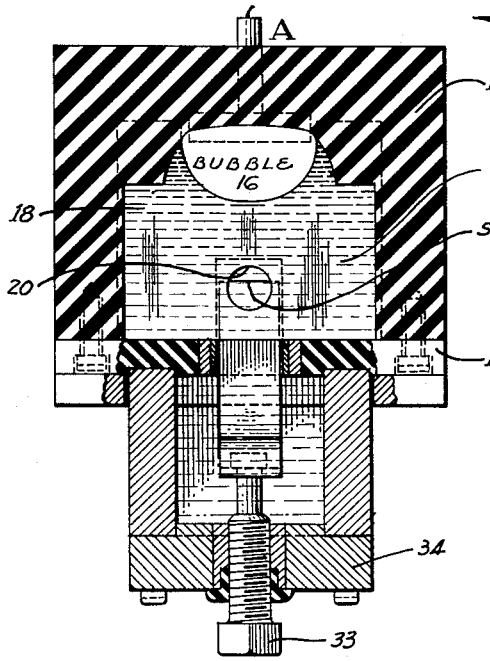
Figure 5 is a cross-sectional view taken as indicated by the line 5—5 in Figure 4.

The vertical baffle and the damping aperture 20 therein integrate random short period regular or intermittent accelerations and angular displacements. The damping aperture 20 restricts the flow of electrolyte along the bottom of the chamber and hence controls the rate of change of bubble position. The rate of change is a function of aperture 20 area. For a particular set of conditions, the size of this aperture may be fixed, as shown in Figures 1 and 2 or can be made adjustable, as shown in Figures 4 and 5.

In this case, baffle 18 is provided with an aperture 20 of a maximum size that would normally be used in the level. The lower portion of the baffle below the aperture is provided with an internal slot 30, this slot containing a cutoff vane 31 extending into a vane well 32 on the casing bottom 17. In this well, the lower end of the vane 31 is rotatably attached to the end of a vane adjustment screw 33 passing through cover 34 of vane well 32. Rotation of screw 33 will move the cutoff vane vertically to change the effective area of damping aperture 20, and thereby change the damping characteristics of the level. In this case, electrode C is in two parts, $C_1$ and $C_2$, one on each side of baffle 18, and in use these electrodes are connected together to act in the same manner as electrode C in the level of Figures 1 and 2.

It is also possible to directly regulate the movement of the bubble as shown in Figures 6 and 7. Here, the entire baffle 18 is vertically movable in side slots 35, the lower end of the baffle 18 extending into a baffle well 36 in the bottom of casing 11. The vertical position of the baffle is controlled as is the vane in Figures 4 and 5, by a baffle adjustment screw 37 passing through the baffle well cover 38.

This latter mode of damping changes the size of the bubble orifice between the top of baffle 18 and the curved top surface 15 of the chamber and "pinches" the bubble, which directly limits the rate of motion of the bubble. While no damping aperture is provided in the baffle of Figures 6 and 7, displacement of the liquid will still occur to permit bubble movement, this displacement being over the top of the baffle. If the baffle be raised to substantially change the bubble contour and the casing 11 is then tilted slightly, but not enough to cause liquid travel over the baffle, the bubble will still move, although its shape will be changed. Nevertheless, the bubble contact area on one top electrode A or B will be increased while the bubble contact area on the other top electrode will be decreased. The amount of bubble contact area on the electrodes is what actually causes the resistance changes, and hence the operating principle of the device is not affected merely by having a solid baffle.

Both modes of changing damping characteristics have been found satisfactory, although for certain purposes the change of size of the damping aperture is preferred, as the damping characteristics of the level can be changed without changing the characteristics of signal response to bubble movements, as will happen in the device of Figures 6 and 7, as the bubble contour will be changed.

It should be noted that the various electrolyte damping means utilized in the present invention permit the use of a very low viscosity, low surface tension coefficient fluid in the level. The use of such a fluid is preferred, as high viscosity fluids which are more or less self-damping do not permit the electrical bubble motion sensing means to function as accurately or to be as sensitive as when low viscosity fluids are utilized.

The device described herein is highly useful as an accelerometer, an instrument for sensing angular changes, and as a highly sensitive level. In all cases, a direct output signal is obtained that is a function of the displacement of the device in the plane in which it is designed to operate. Two such devices placed at a right angle to each other will, of course, provide data desired for the detection of all accelerations in or angular displacements from a level plane, and therefor by definition, from an apparent vertical which is defined as the vector resultant of the surrounding force field.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

What is claimed is:

1. A bubble level comprising a casing defining a chamber having an upper bubble contacting surface, a filling of conducting electrolyte in said casing of an amount sufficient to provide a bubble in said casing, a pair of top electrodes in said bubble contacting surface, flush therewith, and spaced to be simultaneously partly covered by said bubble, a baffle crossing said chamber at a right angle to a line joining said electrodes and substantially centrally positioned therebetween, said baffle extending from just below said bubble to the bottom of said chamber, and a bottom electrode having a portion exposed to said electrolyte on each side of said baffle.

2. A bubble level comprising a casing defining a chamber having an upper bubble contacting surface, a filling of conducting electrolyte in said casing of an amount sufficient to provide a bubble in said casing, a pair of top electrodes in and flush with said bubble contacting surface and spaced to be simultaneously partly covered by said bubble, a baffle crossing said chamber at a right angle to a line joining said electrodes and substantially centrally positioned therebetween, said baffle extending from just below said bubble to the bottom of said chamber, the top of said baffle being cut away with a bubble surface contour, and a bottom electrode having a portion exposed to said electrolyte on each side of said baffle and closely adjacent thereto, means for passing a current between each of top electrodes and said bottom electrode, and means for measuring current change in said paths due to bubble movements thereacross.

3. Apparatus in accordance with claim 1 wherein said baffle is provided with a damping aperture.

4. Apparatus in accordance with claim 1 wherein said baffle is provided with a damping aperture, and wherein means are provided to vary the area of said aperture from outside said casing.

5. Apparatus in accordance with claim 1 wherein means are provided to change the distance between the top of said baffle and said bubble contacting surface, operable from outside said casing.

6. Apparatus in accordance with claim 1 wherein said electrolyte is of low viscosity and low surface tension.

7. A bubble level comprising a casing defining a chamber having an upper bubble contacting surface, a filling of conducting electrolyte in said chamber in an amount sufficient to provide a bubble in said chamber, a pair of spaced top electrodes in said bubble contacting surface positioned flush with said surface, each of said electrodes being of equal length and extended along the line of bubble travel over said surface, said bubble being of an extent sufficient to simultaneously make a bisecting contact with each of said top electrodes when said casing is level, a bottom electrode in the bottom of said casing positioned equidistant from each of said top electrodes, and a baffle extending vertically upwardly from said bottom to contact the bottom of said bubble over an area midway between the ends thereof when said casing is level, the top of said baffle being cut away with a bubble surface contour.

8. Apparatus in accordance with claim 1 wherein said electrolyte is a high concentration of ethyl alcohol made conducting by the addition of sodium iodide.

References Cited in the file of this patent

UNITED STATES PATENTS

| | | |
|---|---|---|
| 902,755 | Meyer | Nov. 3, 1908 |
| 1,375,278 | Clayton | Apr. 19, 1921 |
| 1,506,192 | Meijer | Aug. 26, 1924 |
| 1,593,363 | Schoute | July 20, 1926 |
| 2,067,467 | Urfer | Jan. 12, 1937 |
| 2,155,865 | Leavenworth | Apr. 29, 1939 |
| 2,252,727 | Pepper | Aug. 19, 1941 |
| 2,286,014 | Rowe | June 9, 1942 |
| 2,367,465 | Kunzer | Jan. 16, 1945 |
| 2,387,313 | Wilson | Oct. 22, 1945 |
| 2,414,449 | Chapin | Jan. 21, 1947 |

FOREIGN PATENTS

| | | |
|---|---|---|
| 354,998 | France | 1905 |
| 716,710 | France | 1931 |
| 801,221 | France | 1936 |